United States Patent
Covell et al.

(10) Patent No.: US 11,985,128 B2
(45) Date of Patent: May 14, 2024

(54) DEVICE STEP-UP AUTHENTICATION SYSTEM

(71) Applicant: International Business Machines Corporation, Armonk, NY (US)

(72) Inventors: Jacob Thomas Covell, New York, NY (US); Thomas Jefferson Sandridge, Tampa, FL (US); Alvin Zhang, Somerville, MA (US); Robert Huntington Grant, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 17/406,439

(22) Filed: Aug. 19, 2021

(65) Prior Publication Data

US 2023/0058138 A1    Feb. 23, 2023

(51) Int. Cl.
*H04L 9/40* (2022.01)

(52) U.S. Cl.
CPC ...... *H04L 63/0876* (2013.01); *H04L 63/0272* (2013.01); *H04L 63/0815* (2013.01);
(Continued)

(58) Field of Classification Search
CPC ............ H04L 63/0876; H04L 63/0272; H04L 63/0815; H04L 63/083; H04L 63/0861; H04L 63/102; H04L 63/20; H04L 2463/082; H04L 63/1425; H04L 63/1433; H04L 9/3226; H04L 9/3231; H04W 12/069

See application file for complete search history.

(56) References Cited

U.S. PATENT DOCUMENTS

| | | |
|---|---|---|
| 8,997,208 B2 | 3/2015 | Champagne et al. |
| 9,094,400 B2 | 7/2015 | Barkie |

(Continued)

FOREIGN PATENT DOCUMENTS

CN    100356760 C    12/2007

OTHER PUBLICATIONS

Jangseong Kim et al., "An Efficient and Scalable Re-authentication Protocol over Wireless Sensor Network," May 2011, pp. 516-522. (Year: 2011).*

(Continued)

*Primary Examiner* — Luu T Pham
*Assistant Examiner* — Canh Le
(74) *Attorney, Agent, or Firm* — Brian M. Restauro

(57) ABSTRACT

Embodiments of the present invention provide computer-implemented methods, computer program products and computer systems. Embodiments of the present invention can monitor user activity for one or more user interactions performed while connected to a Virtual Private Network. Embodiments of the present invention can then identify potential risks associated with a user and respective user interactions. Embodiments of the present invention can then, in response to determining a respective user interaction of the one or more interactions is suspicious, generate a real time risk score for the respective user interaction. Embodiments of the present invention can then, in response to the generate real time risk score exceeding a threshold level of risk for the respective user interaction, initiate a secondary authentication protocol.

16 Claims, 4 Drawing Sheets

(52) U.S. Cl.
CPC ........ *H04L 63/083* (2013.01); *H04L 63/0861* (2013.01); *H04L 63/102* (2013.01); *H04L 63/20* (2013.01)

(56) References Cited

U.S. PATENT DOCUMENTS

| | | | |
|---|---|---|---|
| 9,769,120 | B2 | 9/2017 | Fainkichen |
| 10,454,931 | B2 | 10/2019 | Hinaman et al. |
| 10,516,701 | B2 | 12/2019 | Boyadjiev et al. |
| 10,601,800 | B2 | 3/2020 | Kao et al. |
| 2014/0282868 | A1* | 9/2014 | Sheller ................. G06F 21/316 726/3 |
| 2015/0032586 | A1* | 1/2015 | Blackhurst ......... G06Q 30/0631 705/35 |
| 2016/0050224 | A1* | 2/2016 | Ricafort ............. H04L 63/1416 726/23 |
| 2017/0171208 | A1* | 6/2017 | Purushothaman ...... H04L 63/20 |
| 2017/0177844 | A1* | 6/2017 | Da Luz .................. G06F 21/45 |
| 2018/0060562 | A1* | 3/2018 | Waltermann ........... G06F 21/31 |
| 2019/0258786 | A1* | 8/2019 | Shah ..................... G06Q 20/40 |
| 2020/0068031 | A1* | 2/2020 | Kursun ................ H04W 24/02 |
| 2020/0120127 | A1* | 4/2020 | Tyers .................. H04L 63/0236 |
| 2020/0145416 | A1* | 5/2020 | Mitzimberg .......... G06F 21/556 |
| 2021/0194883 | A1* | 6/2021 | Badhwar ............... H04L 63/107 |
| 2022/0318424 | A1* | 10/2022 | D'Agostino ........ G06F 21/6245 |
| 2023/0012385 | A1* | 1/2023 | Manickam ......... H04L 12/4641 |
| 2023/0370444 | A1* | 11/2023 | Sutherland ............. G10L 17/18 |

OTHER PUBLICATIONS

Nils Quermann et al., "The State of User Authentication in the Wild," Aug. 2018 (Year: 2018).*

* cited by examiner

DEVICE STEP-UP AUTHENTICATION SYSTEM

BACKGROUND

The present invention relates in general to mobile device security and in particular to mobile device step-up authentication.

Authentication typically refers to verifying a user's identity is often required to allow access to confidential data or systems. Digital authentication or e-authentication may be used synonymously when referring to the authentication process that confirms or certifies a person's identity and work. When used in conjunction with an electronic signature, it can provide evidence of whether data received has been tampered with after being signed by its original sender. Electronic authentication can reduce the risk of fraud and identity theft by verifying that a person is who they say they are when performing transactions online.

A virtual private network (VPN) extends a private network across a public network and enables users to send and receive data across shared or public networks as if their computing devices were directly connected to the private network. Applications running across a VPN may therefore benefit from the functionality, security, and management of the private network. It provides access to resources that may be inaccessible on the public network and is typically used for telecommuting workers. Encryption is a common, although not an inherent, part of a VPN connection.

Various e-authentication methods can be used to authenticate a user's identify ranging from a password to higher levels of security that utilize multifactor authentication (MFA). Depending on the level of security used, the user might need to prove his or her identity through the use of security tokens, challenge questions, or being in possession of a certificate from a third-party certificate authority that attests to their identity. A VPN is created by establishing a virtual point-to-point connection through the use of dedicated circuits or with tunneling protocols over existing networks. A VPN available from the public Internet can provide some of the benefits of a wide area network (WAN). From a user perspective, the resources available within the private network can be accessed remotely.

SUMMARY

According to an aspect of the present invention, there is provided a computer-implemented method. The computer implemented method comprises: monitoring user activity for one or more user interactions performed while connected to a Virtual Private Network; identifying potential risks associated with a user and respective user interactions; in response to determining a respective user interaction of the one or more interactions is suspicious, generating a real time risk score for the respective user interaction; and in response to the generate real time risk score exceeding a threshold level of risk for the respective user interaction, initiating a secondary authentication protocol.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize limitations with existing authentication systems, specifically with respect to authentication users via an installed VPN. For example, embodiments recognize that access to sensitive or otherwise confidential information via an installed VPN can pose a security concern if devices with installed VPNs are lost or stolen. Specifically, embodiments of the present invention recognize that passwords or security pins (e.g., 4-digit codes) used to access or otherwise initiate connection to a VPN can be guessed or brute forced. Embodiments of the present invention provide an extra layer of security that ensures only the user having authorization to access information can connect to the VPN. Specifically, embodiments of the present invention improve authentication systems by monitoring and subsequently identifying suspicious VPN interactions to selectively prompt users to authentication their identity before accessing information as discussed in greater detail, later in this Specification.

A suspicious activity (i.e., interaction) as used herein, refers to interactions that deviate from established user interactions. In this embodiment, user interactions can be any action taken by users of respective devices when connecting to or when connected to a VPN. For example, a user interaction can be measured by how the user interacts with information the user has access to (e.g., altering files, altering lines of code, saving information to an external hard drive, printing hard copies of files, various screen capturing actions, etc.). A user interaction can also include physical locations of respective users when connecting to or when connected to a VPN. Finally, user interactions can also include contextual information associated with information. For example, where a user is a programmer and the user is accessing and manipulating lines of code during working hours, embodiments of the present invention can recognize the user's role (e.g., programmer), recognize normal working hours (e.g., when the user access and manipulated portions of software code), and recognize whether or not the code the user is accessing matches the user's authorization or security clearance to access or otherwise manipulate that code.

Figure 1:
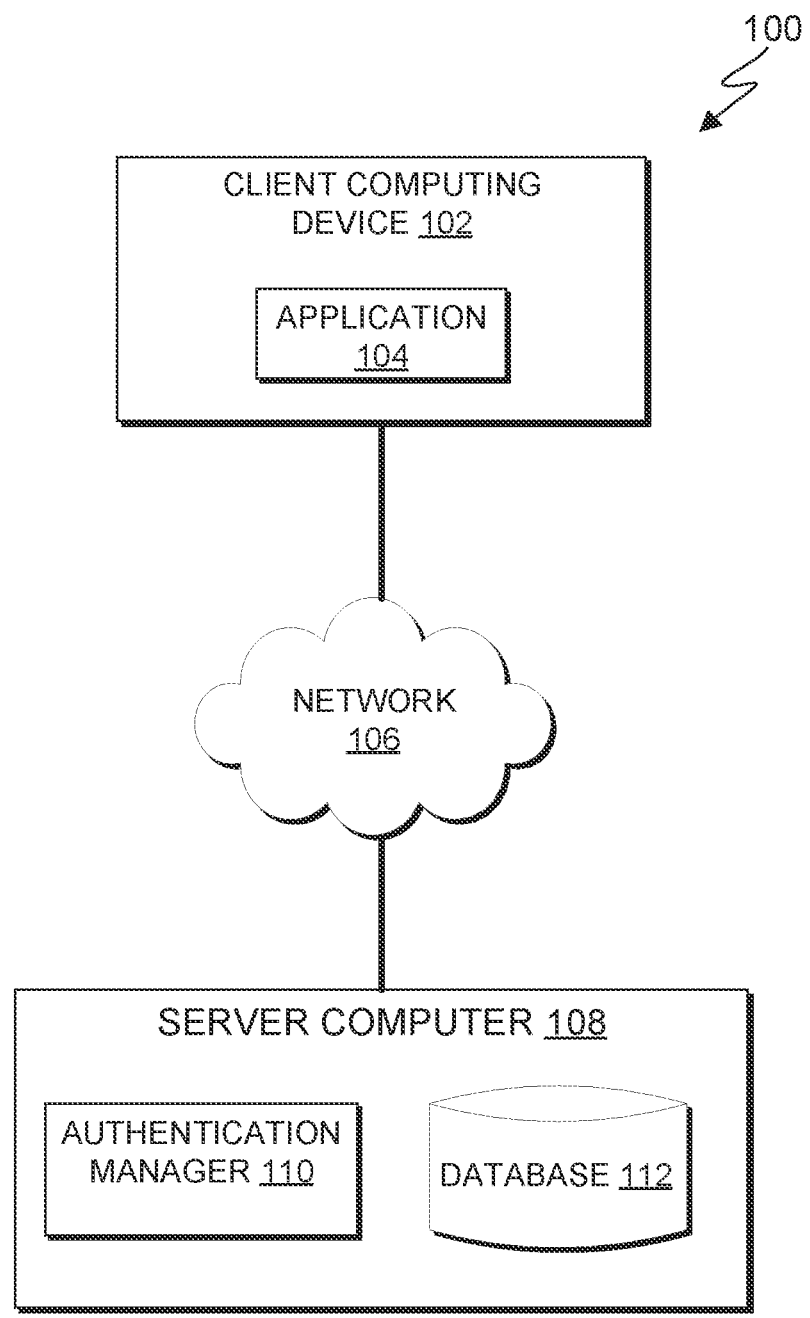
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access authentication manager 110 (e.g., using TCP/IP) to access content, user information, and database information. Application 104 can further communicate with authentication manager 110 to identify potential risks associated with interactions, determine real time risks, and in response to determine risks associated with interactions, prompt mid-connection authentication measures, as discussed in greater detail in FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts authentication manager 110 and database 112. In this embodiment, authentication manager 110 resides on server computer 108. In other embodiments, authentication manager 110 can have an instance of the program (not shown) stored locally on client computer device 102. In other embodiments, authentication manager 110 can be a standalone program or system that by monitor and subsequently identify suspicious VPN interactions to selectively prompt users to authentication their identity before accessing information. In yet other embodiments, authentication manager 110 can be stored on any number or computing devices.

Authentication manager 110 functions as a VPN authentication system and can work on any number of mobile devices (e.g., smartphones, laptops, tablets, etc.) for both personal and company-issued use. In this embodiment, authentication manager 110 provides a mechanism to allow users to opt-in for services provided by authentication manager 110 and similarly provides a mechanism for users to opt-out. In some embodiments, authentication manager 110 can be configured to transmit a notification each time information is collected or otherwise accessed.

In this embodiment, information collected refers to user interactions and user characteristics. User characteristics can reference user profiles (e.g., roles and responsibilities with respect to a specific organization, departments or groups the user belongs two, governance or hierarchal structures, length of employment, specialty areas). User information can also include access to an organization's communication system (e.g., email, transaction backlog, etc.) and systems and applications a user typically uses based on the user's role/responsibilities). Finally, user information can also include user authorizations, that is, accessibility levels and admin capabilities of the user.

As mentioned above, user interactions can be any action taken by users of respective devices when connecting to or when connected to a VPN. For example, a user interaction can be measured by how the user interacts with information the user has access to (e.g., altering files, altering lines of code, saving information to an external hard drive, printing hard copies of files, various screen capturing actions, etc.). A user interaction can also include physical locations of respective users when connecting to or when connected to a VPN. Finally, user interactions can also include contextual information associated with information (e.g., how users interact with information they have access to, physical location of the user, etc.).

In this embodiment, a user profile module (not shown) of authentication manager 110 can utilize collected user information to generate respective user profiles for each registered user of the organization. In this manner, authentication manager 110 can establish a baseline metric for normal user interactions based on the generated user profile.

Authentication manager 110 can then generate a user risk impact potential score to add to respective user profiles. As used herein, a user risk impact score measures potential impact a breach would have if the user' credentials (e.g., login, security credentials, etc.) were used to access the system. In this embodiment, authentication manager 110 generates the user impact potential score by assigning weighted values for the following categories: access to sensitive information, communication patterns demonstrating access to management, decision making ability, transactions, and system admin capabilities.

In response to a user connecting to an organization's network via a VPN using a respective mobile device, authentication manager 110 can analyze user interactions and determine whether respective user interactions are suspicious. As mentioned above, suspicious activity (i.e., interaction) as used herein, refers to interactions that deviate from established user interactions.

In this embodiment, authentication manager 110 analyzes metadata to determine whether user interactions are suspicious. For example, authentication manager 110 can reference the user's profile (e.g., to determine whether the user needs the accessed information for direct responsibilities). Authentication manager 110 can also reference the user's profile to determine systems and applications typically used by the user and cross-reference the user's current location and time to stored "normal" locations and times the user typically accesses the network (e.g., so to determine whether the user is accessing information during non-working hours).

In certain other embodiments, authentication manager 110 can leverage other device sensors for more information. For example, authentication manager 110 can transmit instructions to the device's camera, audio, and biometric scanners (e.g., fingerprint) to help validate the user's identity. Specifically, authentication manager 110 can use visual data from cameras and audio from microphones to identify other nearby users and context of a user accessing data. In some embodiments, authentication manager 110 can utilize eye tracking to monitor user interactions (e.g., to determine what information the user is looking at). In yet other embodiments, authentication manager 110 can monitor user interactions using keystroke loggers to monitor for activities indication screen captures, copy and pasting, etc. Finally, authentication manager 110 monitor user interactions by leverage face scanning technology to analyze changes to a user's facial expression.

In this embodiment, authentication manager 110 can leverage the above-mentioned information and assign each observable interaction a weighted score that represents a real time risk of impact based on the actions performed and on security preferences. For example, authentication manager 110 can receive preferences to assign greater weights (and thus higher potential impact score) to locations other than normal location (e.g., off campus access that isn't the user's home, different countries, etc.) than to connection times, that is, times in which the user accesses the network. Authentication manager 110 can then sum the weighted values and determine whether the user interaction(s) are suspicious if the sum of the weighted values reaches or exceeds a threshold score for suspicious behavior.

In some embodiments, authentication manager 110 can identify a single user interaction as suspicious and meeting a risk threshold level based solely on the type of user interaction (as configured by a security policy). For example, authentication manager 110 can identify a user accessing information (e.g., confidential files) as suspicious when the user has never accessed that type of information before. In this instance, authentication manager 110 initiates a secondary authentication protocol (e.g., a mid-connection step-up authentication to be performed as discussed in greater detail below).

In embodiments where authentication manager 110 does not identify a single user interaction as suspicious and thus triggering the secondary protocol, authentication manager 110 continuously monitors one or more user interactions in real time. In response to authentication manager 110 determining one or more user interactions as suspicious, authentication manager 110 initiates the secondary authentication protocol. In this embodiment, the secondary authentication protocol comprises generating topics associated with the suspicious behavior. In response to the generated topic being classified as having a high-risk potential, authentication manager 110 calculates a real-time risk score for the associated behavior deemed as suspicious and having high risk. In instances where authentication manger 110 calculates a real time risk score that reaches risk topic threshold (i.e., where the risk score for the topic reaches a threshold level of risk), authentication manager 110 proceeds to calculate a real time risk score associated with the user based, at least in part, on the user impact potential score, the immediacy of the request, and the user interaction. In response to the real time risk score reaching or exceeding a risk threshold, authentication manager 110 initiates a mid-connection step-up authentication to be performed (e.g., a traditional password authentication, biometric authentication, single sign-on authentication (SSO), two-factor authentication (2FA), token authentication, etc., chosen by a randomizer module of authentication manager (not shown), etc.). In other embodiments, authentication manager 110 can provide for a manual override for a network admin to manually trigger the secondary authentication protocol (e.g., the step-up authentication).

In this embodiment, authentication manager 110 utilizes a natural language classification and natural language understanding classification module (not shown) to analyze content, context of accessed information. Authentication manager 110 can then classify the accessed information (e.g., determined to be suspicious) using known topic modeling techniques to generate topics associated with the analyzed information.

The topics generated by authentication manager 110 refer to types of information that could be comprised as a result of granted access. Each topic has a corresponding level of risk associated with the topic. In this embodiment, the level or risk can be specified by user preferences. For example, authentication manager 110 can receive a "high risk access table" which includes topics and corresponding levels of risk for each listed topic and use the received high risk access table to compare generated topics to identify the level of risk associated with the generated topic. For example, authentication manager 110 can generate a topic that classifies the received information it previously determined to be suspicious as having the topic (i.e., category) of sensitive data. Authentication manager 110 can then identify from the received high risk access table that requests for access to "sensitive data" is defined as a "high risk" action.

In other embodiments, authentication manager 110 can generate a level of risk and set risk threshold for each topic. For example, authentication manager 110 can utilize topic modeling techniques to classify interactions (previously determined as suspicious) by respective topics that each have corresponding levels of risk. For example, topics can include "system access" and requests thereof, "sensitive data" and requests thereof such as personal information, intellectual property, trade secrets, client information, etc. In this embodiment, each of the topics discussed (e.g., system access and sensitive data) are designated as "high risk", that is, these topics trigger the risk threshold.

Authentication manager 110 can then calculate a real time risk score based, at least in part, on the user impact potential score, and an analysis of immediacy of the request to access the high-risk topic. Authentication manager 110 can also analyze and factor in immediacy of the request. For example, in instances where the user accesses or requests to access information (e.g., containing sensitive information such as finances), authentication manager 110 assigns a weighted value for this interaction thus increasing the risk score. In another example, an un-authenticated user associated with a high user risk impact potential score requests quarterly results information prior to public access. In this scenario, authentication manager 110 can generate a real time risk score of 90.

In this embodiment, authentication manager 110 calculates a real time risk score using a numeric scale where lower numbers indicate a lesser risk and greater numbers indicate a higher risk. For example, authentication manager 110 can utilize a numeric range of a scale from zero to one hundred. In this example, a score of 90 would indicate a higher risk than a score of 60. Authentication manager 110 can be configured to numeric thresholds, that is, assigning higher real time risk scores, based on levels of monetary impact. For example, authentication manager 110 may be configured to automatically trigger the secondary authentication protocol after being configured to trigger when requests to access a monetary amount of 10,000 US dollars or more. In other embodiments, authentication manager 110 can be configured to trigger the secondary authentication protocol to any monetary amount.

In this embodiment, prior to the mid connection step-up authentication being performed, authentication manager 110 can provide a user option to provide feedback. For example, authentication manager 110 can provide the user option to specify that "Authentication is likely not required". In response to authentication manager 110 receiving feedback that "authentication is likely not required, authentication manager 110 identifies this as negative feedback and transmits that feedback to a learning algorithm within the NLU classification module (not shown). Conversely, if the option is not selected, authentication manager 110 identifies this as positive feedback and transmits that feedback to the learning algorithm within the NLU classification module (not shown).

In response to a successful authentication, authentication manager 110 resumes connection to the VPN and allows the user continued access. Conversely, authentication manager 110 terminates connection to the VPN in response to an unsuccessful verification.

Database 112 stores received information and can be representative of one or more databases that give permissioned access to authentication manager 110 or publicly available databases. For example, database 112 can store received user biometrics, training data, threshold values for topics and risks associated for those topics, user profile information (e.g., user risk impact potential, etc.). In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
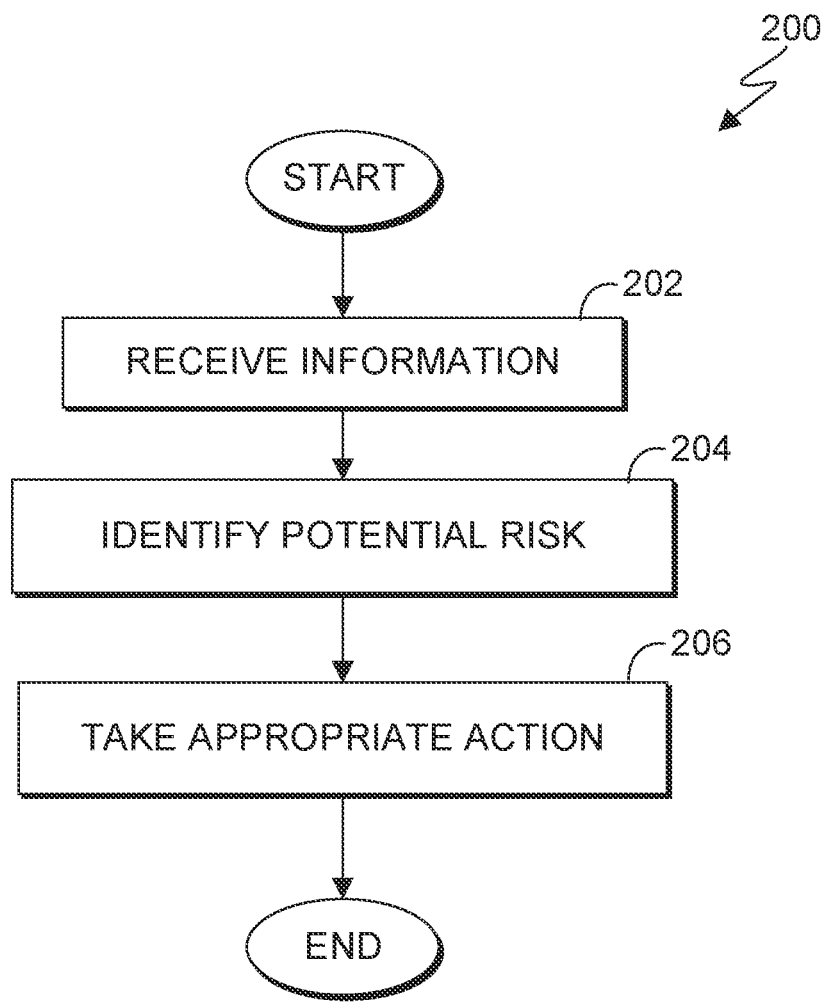
FIG. 2 is a flowchart depicting operational steps for initiating a secondary authentication protocol, in accordance with an embodiment of the present invention.

FIG. 2 is a flowchart 200 depicting operational steps for initiating a secondary authentication protocol, in accordance with an embodiment of the present invention.

In step 202, authentication manager 110 receives information. In this embodiment, the received information can include a request from client computing device 102 to connect to a VPN. In other embodiments, the information received may be a request to register for the services of authentication manager 110. In other embodiments, authentication manager 110 can receive information from one or more other components of computing environment 100.

In instances where a user registers (i.e., in instances where a user does not already have a user profile registered with authentication manager 110), authentication manager 110 can generate a unique user profile for the respective user using the received information. Information received can also include permissioned access to the user's Human Resource database for respective user's profile. For example, authentication manager 110 can access certain user characteristics can reference user profiles (e.g., roles and responsibilities with respect to a specific organization, departments or groups the user belongs two, governance or hierarchal structures, length of employment, specialty areas).

Information received can also include access to access to an organization's communication system (e.g., email, transaction backlog, etc.) and systems and applications a user typically uses based on the user's role/responsibilities). User information can also include user authorizations, that is, accessibility levels and admin capabilities of the user.

Finally, where VPN patterns exist for a respective user, authentication manager 110 can access these records and incorporate them into a respective user profile. As mentioned above, user interactions can include altering files, altering lines of code, saving information to an external hard drive, printing hard copies of files, various screen capturing actions, etc. A user interaction can also include physical locations of respective users when connecting to or when connected to a VPN. Finally, user interactions can also include contextual information associated with information (e.g., how users interact with information they have access to, physical location of the user, etc.). In instances where mobile device VPN interaction patterns are not known or otherwise not registered, authentication manager 110 can receive user interactions and leverage a pattern algorithm to discern user patterns. In this manner, authentication manager 110 can establish a baseline metric for normal user interactions based on the generated user profile.

In step 204, authentication manager 110 identifies potential risk associated with the received information. In this embodiment, authentication manager 110 identifies potential risk associated with the received information by generating a user risk impact potential score and using that generated user risk impact potential score to calculate real time risk associated with an activity or interaction being performed by a user. For example, authentication manager 110 calculates real time risk based on activity or interaction being performed, classifies that interaction or activity as being suspicious, generates topics associated with the suspicious behavior, and, in response to the generated topic being classified as having a high-risk potential, calculates a real-time risk score for the associated behavior deemed as suspicious and having high risk as discussed in greater detail with regard to FIG. 3.

As mentioned above, a user risk impact score measures potential impact a breach would have if the user' credentials (e.g., login, security credentials, etc.) were used to access the system. In this embodiment, authentication manager 110 generates the user impact potential score by assigning weighted values for the following categories: access to sensitive information, communication patterns demonstrating access to management, decision making ability, transactions, and system admin capabilities.

In step 206, authentication manager 110 takes appropriate action. In this embodiment, authentication manager 110 takes appropriate action when a real time risk of an interaction (i.e., activity performed by the user), reaches or exceeds a threshold level of risk. In this embodiment, an appropriate action can include an initiation of a mid-connection step-up authentication (e.g., a re-authentication) to be performed. In this embodiment, authentication manager 110 can utilize a randomizer to select a random, authentication mechanism to reauthenticate a user. For example, authentication manager 110 can randomly select at least one of a traditional password authentication, biometric authentication, single sign-on authentication, two-factor authentication, token authentication, etc. In other embodiments, authentication manager 110 can provide for a manual override for a network admin to manually trigger the secondary authentication protocol (e.g., the step-up authentication).

Accordingly, in response to a successful authentication, authentication manager 110 resumes connection to the VPN and allows the user continued access. Conversely, authentication manager 110 terminates connection to the VPN in response to an unsuccessful verification. In some embodiments, authentication manager 110 can generate a report of the failed re-authentication of the user and transmit the generated report to a system admin of the network. In this manner, authentication manager 110 mitigates risk of sensitive and/or confidential information being accessed. In this way, authentication manager 110 increases security of a network.

Figure 3:
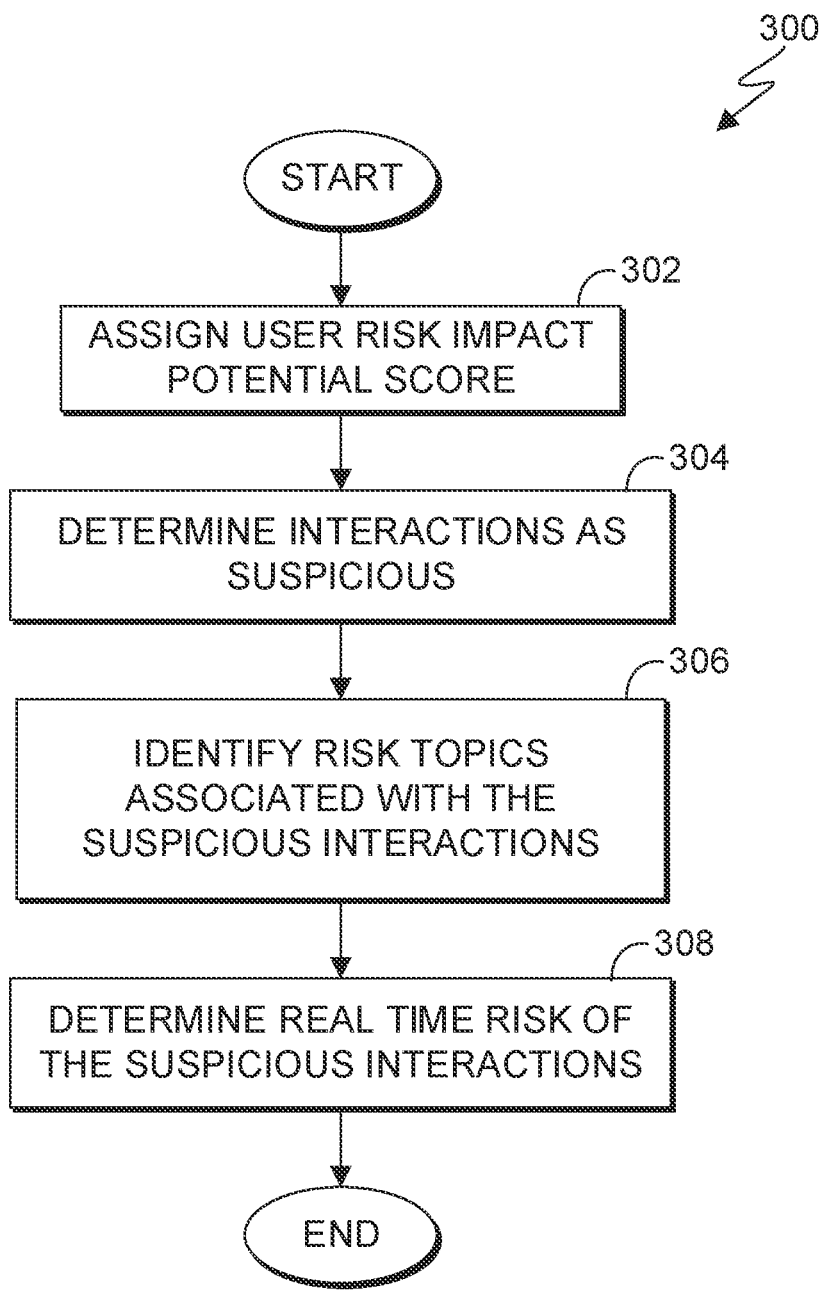
FIG. 3 is a flowchart depicting operational steps for determining real time risk of user interactions, in accordance with an embodiment of the present invention.

FIG. 3 is a flowchart 300 depicting operational steps for determining real time risk of user interactions, in accordance with an embodiment of the present invention.

In step 302, authentication manager 110 assigns a user risk impact potential score. In this embodiment, authentication manager 110 generates the user impact potential score by assigning weighted values for the following categories: access to sensitive information, communication patterns demonstrating access to management, decision making ability, transactions, and system admin capabilities. For example, authentication manager 110 can, in some embodiments assign the same point value for each category that is found (e.g., one point for access to sensitive information, and another point for communication patterns demonstrating access to management). Authentication manager 110 can then sum the assigned values for each category to generate the user risk impact potential score. In other embodiments, authentication manager 110 can assign weighted values to a respective category to prioritize or otherwise increase a risk score for having access to the respective category. For example, authentication manager 110 can assign a numerical value double in value for a "sensitive information" as opposed to "transactions".

In step 304, authentication manager 110 determines interactions as suspicious. In this embodiment, authentication manager 110 determines interactions as suspicious by identifying a user interaction, analyzing metadata associated with the interaction, (e.g., employee profile, applications typically used by the user, location, time of day) comparing the metadata against the user's profile, and classifying the interaction as either suspicious or not suspicious (i.e., normal). For example, authentication manager 110 can reference the user's profile (e.g., to determine whether the user needs the accessed information for direct responsibilities). Authentication manager 110 can also reference the user's profile to determine systems and applications typically used by the user and cross-reference the user's current location and time to stored "normal" locations and times the user typically accesses the network (e.g., so to determine whether the user is accessing information during non-working hours).

In this embodiment, authentication manager 110 determines an interaction to as suspicious based on whether the performed action (e.g., accessing a database) or request to perform an action (e.g., request to access a database) is deemed to be a measured deviation from the user's established, patterned behavior. For example, if the user frequently accesses a database during normal business hours, authentication manager 110 would classify a request to access the same database a measured deviation outside of normal business hours (e.g., accessing the database one minute past 5:00 PM versus accessing the database at 10:00 PM) as a suspicious interaction.

In certain other embodiments, authentication manager 110 can leverage other device sensors for more information. For example, authentication manager 110 can transmit instructions to the device's camera, audio, and biometric scanners (e.g., fingerprint) to help validate the user's identity. Specifically, authentication manager 110 can use visual data from cameras and audio from microphones to identify other nearby users and context of a user accessing data. In some embodiments, authentication manager 110 can utilize eye tracking to monitor user interactions (e.g., to determine what information the user is looking at). In yet other embodiments, authentication manager 110 can monitor user interactions using keystroke loggers to monitor for activities indication screen captures, copy and pasting, etc. Finally, authentication manager 110 monitor user interactions by leverage face scanning technology to analyze changes to a user's facial expression.

In step 306, authentication manager 110 identifies risk topics associated with the suspicious interactions. In this embodiment, authentication manager 110 identifies risk topics by utilizing a natural language classification and natural language understanding classification module to analyze content and context of accessed information. Authentication manager 110 can then classify the accessed information (e.g., determined to be suspicious) using known topic modeling techniques to generate topics associated with the analyzed information.

Each topic has a corresponding level of risk associated with the topic that can be assigned by the organization utilizing authentication manager 110. For example, authentication manager 110 can receive a "high risk access table" which includes topics and corresponding levels of risk for each listed topic and use the received high risk access table to compare generated topics to identify the level of risk associated with the generated topic. Specifically, authentication manager 110 can generate a topic that classifies the received information it previously determined to be suspicious as having the topic (i.e., category) of sensitive data. Authentication manager 110 can then identify from the received high risk access table that requests for access to "sensitive data" is defined as a "high risk" action.

In step 308, authentication manager 110 determines a real time risk of the suspicious interactions. In this embodiment, authentication manager determines a real time risk of the interaction deemed as suspicious by assigning each observable interaction a weighted score that represents a real time risk of impact based on the actions performed and on security preferences. For example, authentication manager 110 can receive preferences to assign greater weights (and thus higher potential impact score) to locations other than normal location (e.g., off campus access that isn't the user's home, different countries, etc.) than to connection times, that is, times in which the user accesses the network. Authentication manager 110 can then sum the weighted values and determine whether the user interaction(s) are suspicious if the sum of the weighted values reaches or exceeds a threshold score for suspicious behavior.

Figure 4:
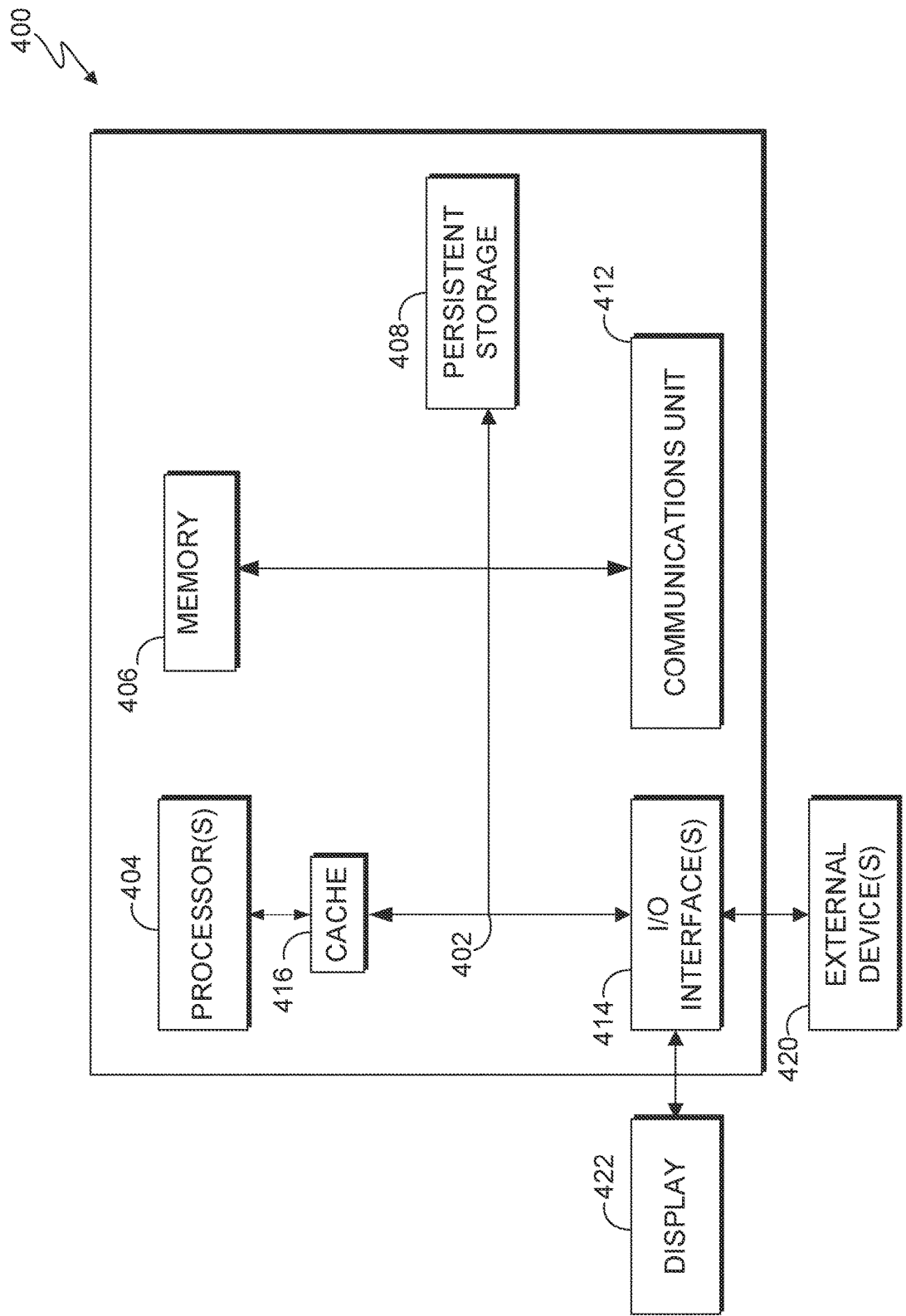
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Authentication manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Authentication manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., authentication manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    monitoring user activity for one or more user interactions performed while connected to a Virtual Private Network (VPN);
    generating a user impact score that measures potential impact if credentials of the user maintained access to the VPN by assigning weighted values to the user's access to sensitive information, the user's communication patterns demonstrating access to management, the user's decision making ability, transactions of the user, and system admin capabilities of the user;
    determining a respective user interaction of the one or more user interactions deviates from established user interactions based on location of the user, times the user accesses the VPN, and biometrics of the user;
    assigning each interaction of the user a weighted score that represents a real time risk of impact based on the actions performed; and
    in response to the generated user impact score and weighted score that represents the real time risk of impact based on the actions performed exceeding a threshold level of risk authenticating the user's identity before allowing an action to perform the respective user interaction via random selection of an authentication measure; and
    in response to a failed reauthentication of the user's identity, terminating connection to the VPN.

2. The computer-implemented method of claim 1, wherein reauthenticating the user's identifying before allowing an action to perform the respective user interaction comprises:
    re-authenticating the user's identity before allowing an action to perform the respective user interaction via a company-issued mobile device mobile connecting to a respective VPN.

3. The computer-implemented method of claim 1, wherein re-authenticating the user's identity before allowing an action to perform the respective user interaction via a company-issued mobile device mobile connecting to a respective VPN comprises randomly selecting an authentication measure from the group consisting: a traditional password authentication, biometric authentication, single sign-on authentication, two-factor authentication, and token authentication.

4. The computer-implemented method of claim 1, wherein identifying potential risks associated with a user and respective user interactions comprises:
    determining a user interaction or activity as suspicious based on a user's profile, location, time of day, data collected from the user's device using natural language classification and natural language understanding classification module.

5. The computer-implemented method of claim 1, wherein identifying potential risks associated with a user and respective user interactions comprises:
    generating a user risk impact potential score based on a user's profile by assigning weighted values to one or more categories comprising: access to sensitive information, communication patterns demonstrating access to management, decision making ability, transactions, and system admin capabilities;
    determining at least one interaction of the one or more interactions is suspicious based on metadata associated with the at least one interaction; and
    generating risk topics with the at least one interaction of the one or more interactions that has been determined to be suspicious.

6. The computer-implemented method of claim 5, further comprising:
comparing the generated risk topics with the at least one interaction to a risk access table to identify a specified level of risk associated with the at least one interaction.

7. A computer program product comprising:
one or more computer readable storage media and program instructions stored on the one or more computer readable storage media, the program instructions comprising:
program instructions to monitor user activity for one or more user interactions performed while connected to a Virtual Private Network (VPN);
program instructions to determine a respective user interaction of the one or more user interactions deviates from established user interactions based on a user's profile, location, time of day, and data collected from the user's device using natural language classification and natural language understanding classification module;
program instructions to, in response to determining a respective user interaction of the one or more user interactions deviates from established user interactions, initiating a secondary authentication protocol comprising:
program instructions to generate a topic associated with the user interaction of the one or more user interactions that deviates from established user interactions and in response to the generated topic,
program instructions to, in response to generating a topic associated with the user interaction of the one or more user interactions being classified as having a high-risk potential, calculate a real-time risk score for the associated user interaction based on a user impact score and immediacy of the user interaction, and
program instructions to, in response to the calculated real-time risk score for the user interaction reaching a risk threshold, initiate a mid-connection, step-up authentication; and
program instructions to, in response to a failed mid-connection, step-up authentication of the user's identity, terminate connection to the VPN.

8. The computer program product of claim 7, wherein the program instructions stored on the one or more computer readable storage media further comprise:
program instructions to re-authenticate the user's identity before allowing an action to perform the respective user interaction via a company-issued mobile device mobile connecting to a respective VPN.

9. The computer program product of claim 8, wherein the program instructions stored on the one or more computer readable storage media further comprise:
program instructions to randomly select an authentication measure from the group consisting: a traditional password authentication, biometric authentication, single sign-on authentication, two-factor authentication, and token authentication.

10. The computer program product of claim 7, wherein the program instructions stored on the one or more computer readable storage media further comprise:
program instructions to identify potential risks associated with a user and respective user interactions, wherein the program instruction to identify potential risks associated with a user and respective user interactions comprise:
program instructions to generate a user risk impact potential score based on a user's profile by assigning weighted values to one or more categories comprising: access to sensitive information, communication patterns demonstrating access to management, decision making ability, transactions, and system admin capabilities;
program instructions to determine at least one interaction of the one or more interactions is suspicious based on metadata associated with the at least one interaction; and
program instructions to generate risk topics with the at least one interaction of the one or more interactions that has been determined to be suspicious.

11. The computer program product of claim 10, wherein the program instructions stored on the one or more computer readable storage media further comprise:
program instructions to compare the generated risk topics with the at least one interaction to a risk access table to identify a specified level of risk associated with the at least one interaction.

12. A computer system comprising:
one or more computer processors;
one or more computer readable storage media; and
program instructions stored on the one or more computer readable storage media for execution by at least one of the one or more computer processors, the program instructions comprising:
program instructions to monitor user activity for one or more user interactions performed while connected to a Virtual Private Network (VPN);
program instructions to determine a respective user interaction of the one or more user interactions deviates from established user interactions based on a user's profile, location, time of day, and data collected from the user's device using natural language classification and natural language understanding classification module;
program instructions to, in response to determining a respective user interaction of the one or more user interactions deviates from established user interactions, initiating a secondary authentication protocol comprising:
program instructions to generate a topic associated with the user interaction of the one or more user interactions that deviates from established user interactions and in response to the generated topic,
program instructions to, in response to generating a topic associated with the user interaction of the one or more user interactions being classified as having a high-risk potential, calculate a real-time risk score for the associated user interaction based on a user impact score and immediacy of the user interaction, and
program instructions to, in response to the calculated real-time risk score for the user interaction reaching a risk threshold, initiate a mid-connection, step-up authentication; and
program instructions to, in response to a failed mid-connection, step-up authentication of the user's identity, terminate connection to the VPN.

13. The computer system of claim 12, wherein the program instructions stored on the one or more computer readable storage media further comprise:
program instructions to re-authenticate the user's identity before allowing an action to perform the respective user interaction via a company-issued mobile device mobile connecting to a respective VPN.

14. The computer system of claim 13, wherein the program instructions stored on the one or more computer readable storage media further comprise:
   program instructions to randomly select an authentication measure from the group consisting: a traditional password authentication, biometric authentication, single sign-on authentication, two-factor authentication, and token authentication.

15. The computer system of claim 12, wherein the program instructions stored on the one or more computer readable storage media further comprise:
   program instructions to identify potential risks associated with a user and respective user interactions, wherein the program instruction to identify potential risks associated with a user and respective user interactions comprise:
      program instructions to generate a user risk impact potential score based on a user's profile by assigning weighted values to one or more categories comprising: access to sensitive information, communication patterns demonstrating access to management, decision making ability, transactions, and system admin capabilities;
      program instructions to determine at least one interaction of the one or more interactions is suspicious based on metadata associated with the at least one interaction; and
      program instructions to generate risk topics with the at least one interaction of the one or more interactions that has been determined to be suspicious.

16. The computer system of claim 15, wherein the program instructions stored on the one or more computer readable storage media further comprise:
   program instructions to compare the generated risk topics with the at least one interaction to a risk access table to identify a specified level of risk associated with the at least one interaction.

* * * * *